United States Patent
Reusche et al.

(10) Patent No.: US 7,285,760 B2
(45) Date of Patent: Oct. 23, 2007

(54) BUCKET WITH ACCESS DOOR

(75) Inventors: Thomas K. Reusche, Elburn, IL (US);
Philip E. Chumbley, Aurora, IL (US);
James R. McHugh, Downers Grove, IL (US)

(73) Assignee: Allied Precision Industries, Inc., Elburn, IL (US)

( * ) Notice: Subject to any disclaimer, the term of this patent is extended or adjusted under 35 U.S.C. 154(b) by 0 days.

(21) Appl. No.: 11/092,276

(22) Filed: Mar. 29, 2005

(65) Prior Publication Data
US 2006/0237429 A1    Oct. 26, 2006

(51) Int. Cl.
F24H 1/06 (2006.01)
A01K 7/00 (2006.01)
B65D 43/18 (2006.01)

(52) U.S. Cl. .................. 219/438; 220/816; 206/702; 119/73

(58) Field of Classification Search ............... 206/702; 220/816
See application file for complete search history.

(56) References Cited

U.S. PATENT DOCUMENTS

| | | | | |
|---|---|---|---|---|
| 1,616,125 A | * | 2/1927 | Holman | 43/56 |
| 1,899,308 A | * | 2/1933 | Brown et al. | 119/203 |
| 2,392,208 A | * | 1/1946 | Wilken | 219/432 |
| 2,460,509 A | * | 2/1949 | Keller | 219/436 |
| 2,727,134 A | * | 12/1955 | Wilken | 392/444 |
| 3,217,444 A | * | 11/1965 | Howard | 43/57 |
| 3,482,078 A | * | 12/1969 | Milne | 219/387 |
| 3,820,508 A | * | 6/1974 | Robinson | 119/73 |
| 4,037,081 A | * | 7/1977 | Aldridge et al. | 219/387 |
| 4,230,777 A | * | 10/1980 | Gatto | 429/97 |
| 4,420,678 A | * | 12/1983 | Kalb | 219/387 |
| 4,752,539 A | * | 6/1988 | Vatter | 429/97 |
| 4,885,219 A | * | 12/1989 | Miller | 429/99 |
| 4,908,501 A | * | 3/1990 | Arnold, III | 219/438 |
| 5,140,134 A | * | 8/1992 | Reusche et al. | 219/441 |
| 5,345,063 A | * | 9/1994 | Reusche et al. | 219/441 |
| 5,848,701 A | * | 12/1998 | Riccabona | 206/702 |
| 6,469,281 B1 | | 10/2002 | Reusche et al. | |

* cited by examiner

Primary Examiner—Joseph Pelham
(74) Attorney, Agent, or Firm—McAndrews, Held & Malloy, Ltd.

(57) ABSTRACT

A bucket including a bottom section and a side wall extending upwardly therefrom to define an interior region. The bottom section has a compartment located therein. The bottom section further includes a door that may be moved between a first position that allows access to the compartment and a second position that closes the compartment.

30 Claims, 7 Drawing Sheets

BUCKET WITH ACCESS DOOR

BACKGROUND OF THE INVENTION

Certain embodiments of the present invention relate to a bucket having a door that provides access to a compartment within the bucket. More particularly, certain embodiments of the present invention relate to a bucket having a compartment carrying a heating device and power cord for heating the bucket and a door that provides access to the cord within the compartment.

Farmers, ranchers, veterinarians or any other individuals that own or care for large animals such as horses, cows, or dogs usually keep the animals outside or in barns or stalls all year long. Water is usually provided to the animals in large buckets or tanks from which the animal can drink. However, during the winter when temperatures drop below freezing, the water freezes in the buckets and the animals cannot drink.

Therefore, heaters are used with the buckets to keep the water from freezing in the winter. A conventional heated bucket is plastic and has a top section and a bottom section. The top section is bucket-shaped with a base and wall defining an interior region for holding water. The top section also has a compartment located underneath the base. A small electrical heater is mounted along the wall of the bucket. The heater is connected to a wiring box under the base in the compartment. The wiring box is connected to a power cord which is stored in the compartment. The bottom section is generally circular or cylindrical in shape and is sized to cover the entire exposed bottom of the top section to cover the compartment. The bottom section and the top section have corresponding rigid plastic connection parts, such as tabs and slots, in order to snapably connect the bottom section over the top section to cover the compartment.

In operation, the user detaches the bottom section from the top section to open the compartment and expose the power cord. The power cord is then extended out of the compartment and plugged into an electrical outlet. The bottom section is then snapably re-connected to the top section with the cord extending out of the compartment through a gap in either the top or bottom section. When the power cord is plugged into the outlet, the heater produces heat along the wall of the bucket to keep water in the top section from freezing. When the user is done with heating the bucket, the user again removes the bottom section, replaces the power cord back into the compartment and then snapably re-connects the bottom section to the top section.

The detachable bottom section of the conventional heated bucket can be difficult to use. The bottom section is large and cumbersome to handle because it covers the entire bottom of the top section. Therefore, a user can have difficulty in aligning and engaging the connection parts of the bottom section with the corresponding connection parts of the top section to snapably re-connect the top and bottom sections. Also, because both the top and bottom sections are formed of rigid plastic, a user can have difficulty snapably connecting and disconnecting the corresponding connection parts of the top and bottom sections. Additionally, it is inconvenient to have to detach and re-attach the bottom section every time the power cord is removed from, or returned to, the compartment.

Therefore, a need exists for a heated bucket that allows for simple and easy access to the power cord.

BRIEF SUMMARY OF THE INVENTION

Certain embodiments of the present invention include a bucket. The bucket includes a bottom section and a side wall extending upwardly therefrom to define an interior region. The bottom section has a compartment located therein. The bottom section further includes a door that may be moved between a first position that allows access to the compartment and a second position that closes the compartment.

Certain embodiments of the present invention include a heated bucket system. The heated bucket system includes a bucket having a bottom section and a side wall extending upwardly from the bottom section. The bottom section includes a compartment disposed therein and a door disposed proximate the compartment. The heated bucket system also includes a heater disposed to heat the side wall and a power cord disposed within the compartment and being connected to the heater for delivering power thereto. The door is movable to open a portion of the compartment such that the power cord can be extended out of the compartment.

Certain embodiments of the present invention include a heated bucket system. The heated bucket system includes an outer bucket section having a first base and a side wall extending upwardly from the base. The heated bucket system includes an inner bucket section having a second base and being disposed within the outer bucket section such that the first and second bases define a compartment therebetween. The first base has a door disposed thereon. The heated bucket system includes a heater disposed to heat at least one of the inner and outer bucket sections and a power cord disposed within the compartment and being connected to the heater for delivering power thereto. The door is movable to open a portion of the compartment such that the power cord can be extended out of the compartment.

Certain embodiments of the present invention include a heated bucket system. The heated bucket system includes an outer bucket section having a first base and a side wall extending upwardly from the base. The heated bucket system includes an inner bucket section having a second base and being disposed within the outer bucket section such that the first and second bases define a compartment therebetween. The first base has an aperture that opens to the compartment and a door mounted to the first base such that the door is rotatable between a first position and a second position about the aperture. The heated bucket system includes a heater disposed to heat at least one of the inner and outer bucket sections and a power cord disposed within the compartment and being connected to the heater for delivering power thereto. When the door is in the first position, the aperture is at least partially open to provide access to the power cord in the compartment and when the door is in the second position, the aperture is mostly covered to close the compartment.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentality shown in the attached drawings.

DETAILED DESCRIPTION OF THE INVENTION

Figure 1:
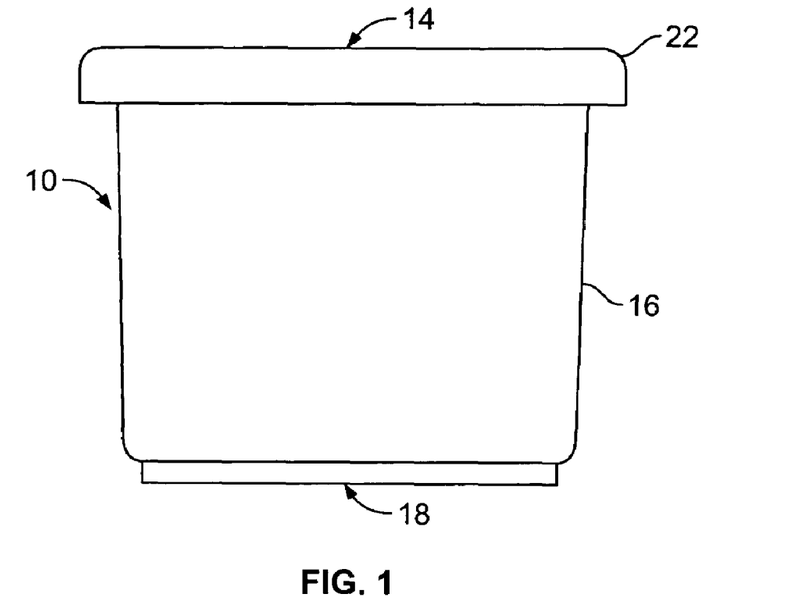
FIG. 1 illustrates an isometric view of a heated bucket formed according to an embodiment of the present invention.

FIG. 1 illustrates an isometric view of a bucket 10 formed according to an embodiment of the present invention. The bucket 10 is formed from a rigid plastic but may be made of any number of other sturdy, flexible materials. The bucket 10 has an open top end 14 and bottom 18. The bucket 10 includes an outer wall 16 extending around the periphery thereof from the bottom 18 to a curved lip 22 at the top end 14 that curves over the outer wall 16 generally parallel with the outer wall 16. The bucket 10 may include any number of handles configured for carrying the bucket 10. The bucket 10 may vary in size and shape to suit the needs of the user.

Figure 2:
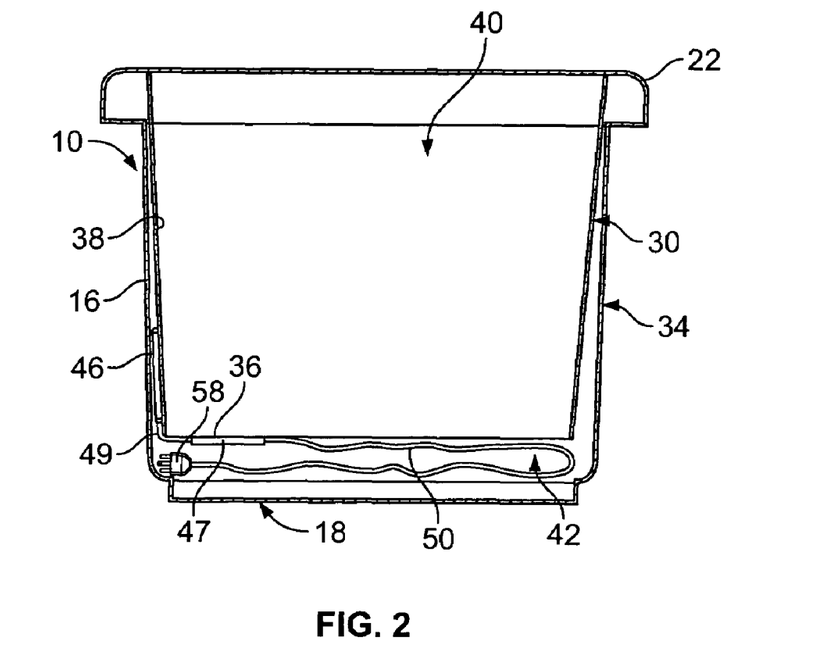
FIG. 2 illustrates a cross-sectional side view of the bucket of FIG. 1.

FIG. 2 illustrates a cross-sectional side view of the bucket 10 of FIG. 1. The bucket 10 is defined by a first inner section 30 received and retained within a second outer section 34. The outer section 34 includes the outer wall 16, bottom 18, and the lip 22. The inner section 30 has a base 36 positioned above, and generally parallel with, the bottom 18 of the outer section 34 and a side wall 38 that is received within the outer wall 16 of the outer section 34. The base 34 and the side wall 38 define an interior region 40 within the bucket 10 for holding materials. The inner section 30 may be retained within the outer section 34 by screws or fasteners, corresponding snapable plastic parts, by glue or an epoxy, or any number of other ways. Alternatively, the inner section 30 may be formed integrally with the outer section 34. Furthermore, the inner section 30 may have a plastic lip that fits about and is configured to snapably connect over the lip 22 of the outer section 34 such that the inner section 30 may be attached to, or detached from, the outer section 34. A small electrical heater 46 is fitted between the inner section 30 and the outer section 34 along the side wall 38 of the bucket 10. The heater 46 may be mounted to the inner section 30 or outer section 34 by glue, epoxy, fasteners, or any number of other methods. By way of example only, the heater 46 may be a foil heater.

The inner section 30 and the outer section 34 define a compartment 42 between the base 36 of the inner section 30 and the bottom 18 of the outer section 34. The base 36 includes a bottom side 50 that has a pocket (not shown) in the surface thereof. A small wiring box 47 is fitted into the pocket on the bottom side 50 of the base 36 and extends from the bottom side 50 into the compartment 42. The heater 46 is electrically connected to the wiring box 47 by leads 49. The wiring box 47 may be connected to the base 36 by glue, resin, epoxy, fasteners or any number of other methods. The wiring box 47 is electrically connected to an electrical power cord 54 having a plug 58. The power cord 54 is wound in a coil and stored within the compartment 42. When the plug 58 is connected to a power outlet (now shown), the heater 46 may be activated to heat the inner section 30 and thus any contents of the interior region 40. The heater 46 may be thermostatically controlled and may vary in the amount of heat it produces depending on the size of the bucket. The power cord 54 may be loosely enclosed in a coil to protect the cord 54 from being damaged or chewed by animals. Alternatively, the heater 46 may be mounted to the base 36 in the compartment 42 and may be directly connected to the power cord 54.

Figure 3:
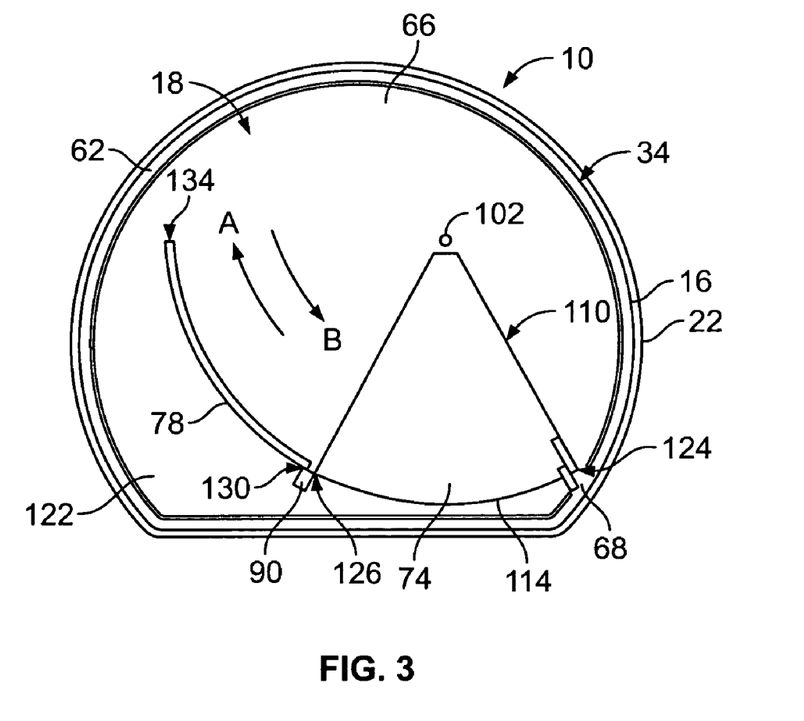
FIG. 3 illustrates a bottom view of the bucket of FIG. 1.

FIG. 3 illustrates a bottom view of the bucket 10 of FIG. 1. The bottom 18 of the outer bucket 34, the outer wall 16, and the lip 22 are generally semi-circle in shape in the shown embodiment but may also be any number of other shapes including generally cylindrical, conical, curved, or angled. The bottom 18 of the outer bucket 34 includes a rim 62 extending perpendicularly outward from a base 66. The rim 62 includes a gap 68 sized for receiving the power cord 54 (FIG. 2). The base 66 includes a generally triangular shaped aperture 110 partly defined by a rounded edge 114 extending along the base 66 between opposite first and second ends 124 and 126 proximate the rim 62. Alternatively, the aperture 110 may have any number of other shapes. The base 66 also includes a door 74 and a curved slot 78 proximate the door 74. The door 74 is connected to the base 66 by a pin 102 about which the door 74 may rotate in the directions of arrows A or B. Alternatively, the door 74 may be connected to the base 66 by a screw or any number of other methods that allow for the door 74 to rotate about the base 66. The door 74 is shown in a closed position covering up the aperture 110. It will be understood that when the door "closes" the aperture 110 or is in the "closed position," the door 74 may not entirely cover up or close off the aperture 100 but may only cover up or close off a portion of the aperture 100. The door 74 may be rotated in the direction of arrow A to an open position at least partly opening the aperture 110 to allow access to the compartment 42 (FIG. 2).

Figure 4:
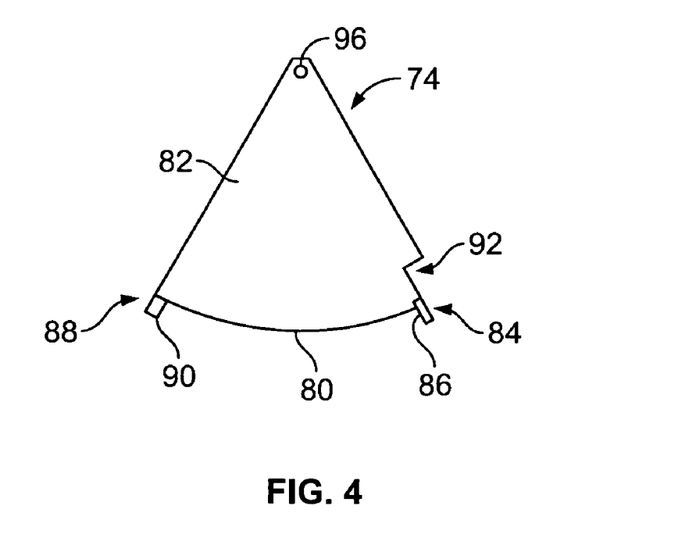
FIG. 4 illustrates a bottom view of the door of FIG. 3.

FIG. 4 illustrates a bottom view of the door 74 of FIG. 3. The door 74 has a generally triangular shaped body 82 with a rounded section 80 having opposite first and second ends 84 and 88. Alternatively, the door 74 may have any number of other shapes. The door 74 includes a rectangular handle 86 extending perpendicularly outward from the body 82 at the first end 84 and a rectangular tab 90 extending perpendicularly outward from the body 82 at the second end 88. The door 74 includes a gap 92 proximate the handle 86 at the first end 84. The door 74 includes a hole 96 extending therethrough for receiving the pin 102 (FIG. 3) about which the door 74 may rotate. The door 74 is formed from thin plastic but alternatively may be made of any other rigid materials.

Figure 5:
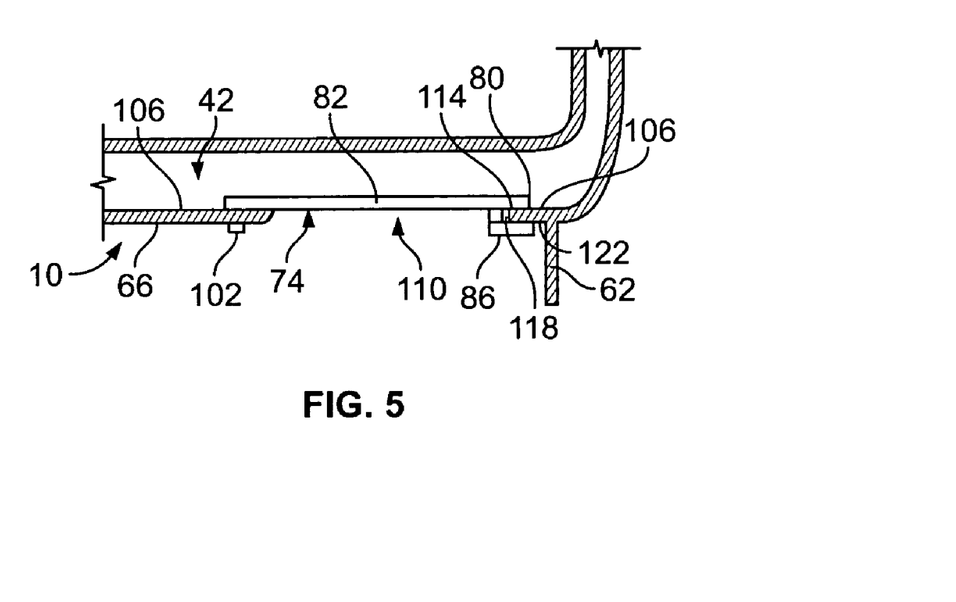
FIG. 5 illustrates a partial cross-sectional side view of the bucket of FIG. 3.

FIG. 5 illustrates a partial cross-sectional side view of the bucket 10 of FIG. 3. The door 74 is connected to the base 66 by the pin 102. The body 82 of the door 74 is located within the compartment 42 and is in contact with a top surface 106 of the base 66 surrounding the aperture 110. The door 74 is in the closed position and covers the aperture 110. The handle 86 extends from the body 82 of the door 74 to define a gap 118 therebetween. The gap 118 is large enough to accommodate the thickness of the base 66 and receives the rounded edge 114 of the base 66 proximate the rim 62. The handle 86 is positioned to engage a bottom surface 122 of the base 66, and the body 82, on the opposite side of the gap 118 is positioned to engage the top surface 106 of the base 66. The rounded section 80 of the door 74 is aligned with the rounded edge 114 along the aperture 110, such that, as the door 74 rotates about the pin 102, the handle 90 moves along the rounded edge 114 of the base 66 and the gap 118 retains the door 74 about the rounded edge 114. The tab 90 (FIG. 4) likewise defines a gap with the body 82 of the door 74 to retain the door 74 about the rounded edge 114 of the base 66.

Returning to FIG. 3, the curved slot 78 extends through the base 66 to the compartment 42 (FIG. 2) from a first end 130 proximate the aperture 110 to a second end 134. The tab 90 extends from the door 74 in the compartment 42 (FIG. 2) through the slot 78 and along the bottom surface 122 of the base 66. The slot 78 is positioned along the radial path of the rounded section 80 (FIG. 4) of the door 74 such that the tab 90 moves within the slot 78 as the door 74 is rotated in the direction of arrows A and B. Thus, the tab 90 and the slot 78 operate to guide and retrain the movement of the door 74 along the base 66. Also, by extending out across the bottom surface 122 of the base 66, both the tab 90 and the handle 86 support the door 74 and prevent the door 74 from being pushed or bent into the compartment 42.

In operation, when the door is in the closed position as shown, the handle 86 of the door 74 is proximate the first end 124 of the rounded edge 114 of the aperture 110 and the tab 90 is proximate the first end 130 of the slot 78. The door 74 may be rotated from the closed position to an open position by gripping the handle 86 and rotating the handle 86 in the direction of arrow A until the handle 86 engages the second end 126 of the rounded edge 114 of the aperture 110 and the tab 90 engages the second end 134 of the slot 78.

Figure 6:
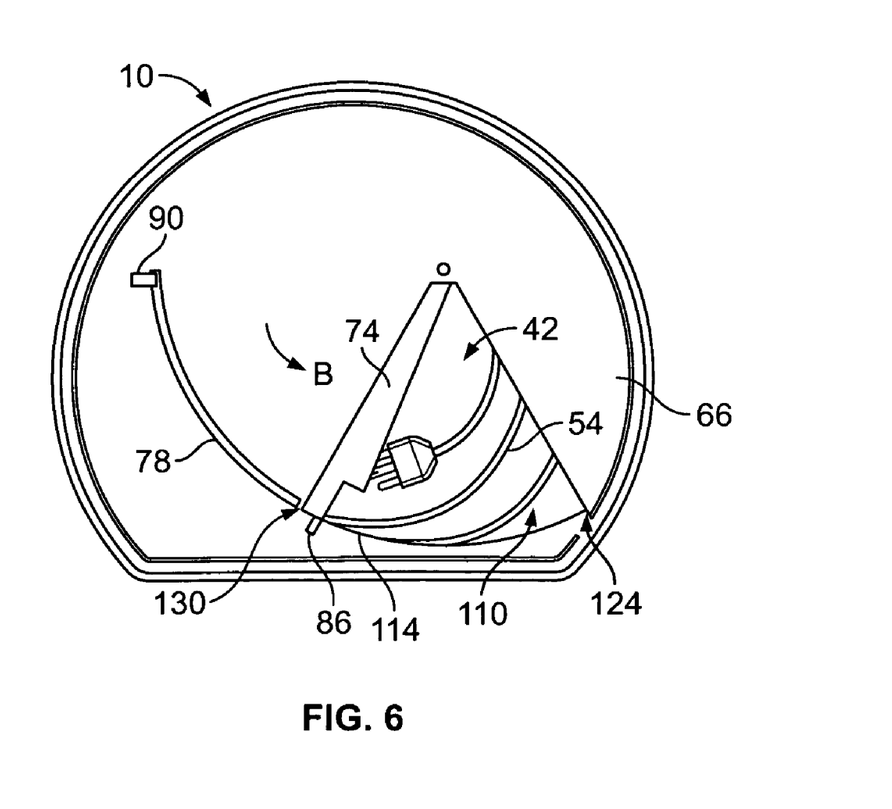
FIG. 6 illustrates a bottom view of the bucket of FIG. 3 with the door in the open position.

FIG. 6 illustrates the bottom view of the bucket 10 of FIG. 3 with the door 74 in the open position. The body 82 of the door 74 is located in the compartment 42 behind the base 66 and the aperture 110 is open to allow access to the compartment 42. The power cord 54 may be extended out of the compartment 42 through the aperture 110 to connect the plug 58 to an electrical outlet (not shown). The heater 46 (FIG. 2) is then activated to produce heat at the base 36 to warm any liquid in the bucket 10 such that the liquid does not freeze. After the power cord 54 has been plugged into the outlet, the door 74 may be rotated in the direction of arrow B back to the closed position. The door 74 reaches the closed position when the handle 86 engages the first end 124 of the rounded edge 114 of the aperture 110 and the tab 90 engages the first end 130 of the slot 78.

Figure 7:
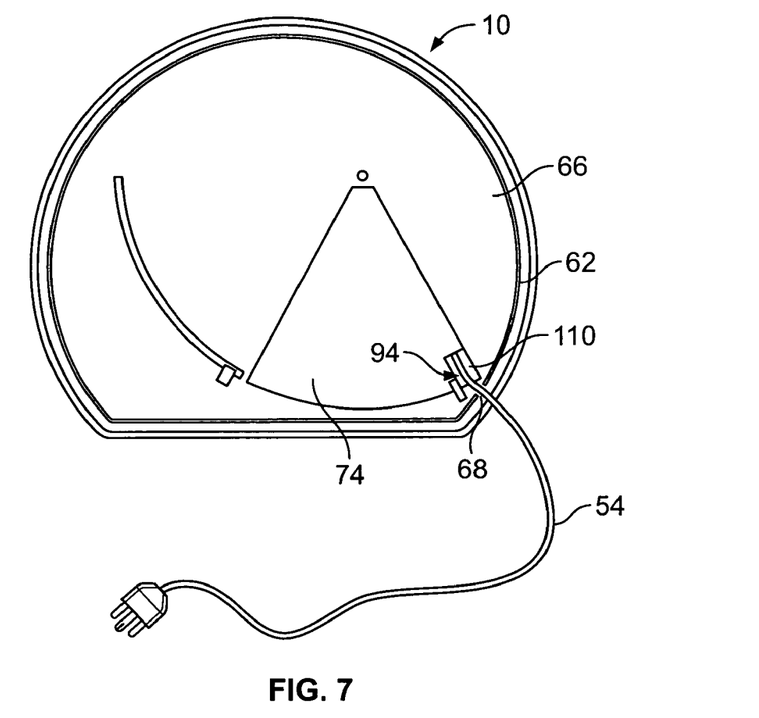
FIG. 7 illustrates a bottom view of the bucket 10 of FIG. 3 with the door in the closed position.

FIG. 7 illustrates the bottom view of the bucket 10 of FIG. 3 with the door 74 closed and the power cord 54 extending out of the compartment 42 (FIG. 2). The door 74 can be moved to the closed position with the power cord 54 extending out of the aperture 110 through the gap 94 in the door 74. Additionally, the power cord 54 can be extended from under the base 66 through the gap 68 in the rim 62 so that the bucket 10 can be placed on the ground or floor without the rim 62 being placed in an unbalanced position on top of the power cord 54. The heated bucket 10 is then filled with liquid and positioned such that animals may drink out of the bucket 10. For example, the heated bucket 10 may be hung in a stall or placed by a feeder. When the bucket 10 no longer needs to be heated, the power cord 54 is unplugged and the door 74 is rotated back to the open position. The power cord 54 is wound into a coil and placed in the compartment 42 through the aperture 110 for storage. The door 74 is then simply rotated back to the closed position until the next time the bucket 10 needs to be heated.

Figure 8:
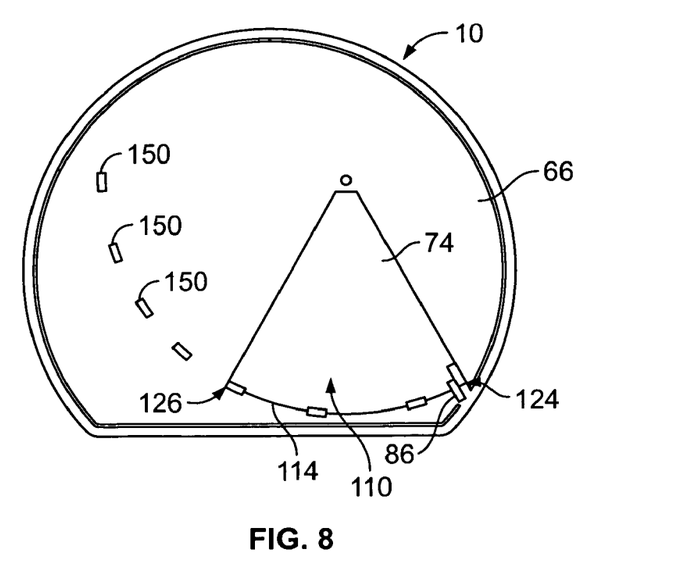
FIG. 8 illustrates a bottom view of the bucket 10 formed according to an embodiment of the present invention.

In an alternative embodiment, the single slot 78 can be replaced by a series of slots 150, as shown in FIG. 8. The slots 150 are aligned along the radial path of the rounded section 80 (FIG. 4) of the door 74 like the slot 78 of FIG. 3. The door 74 used with the series of slots 150 is generally the same as the embodiment shown in FIG. 4 except it does not have the tab 90.

Figure 9:
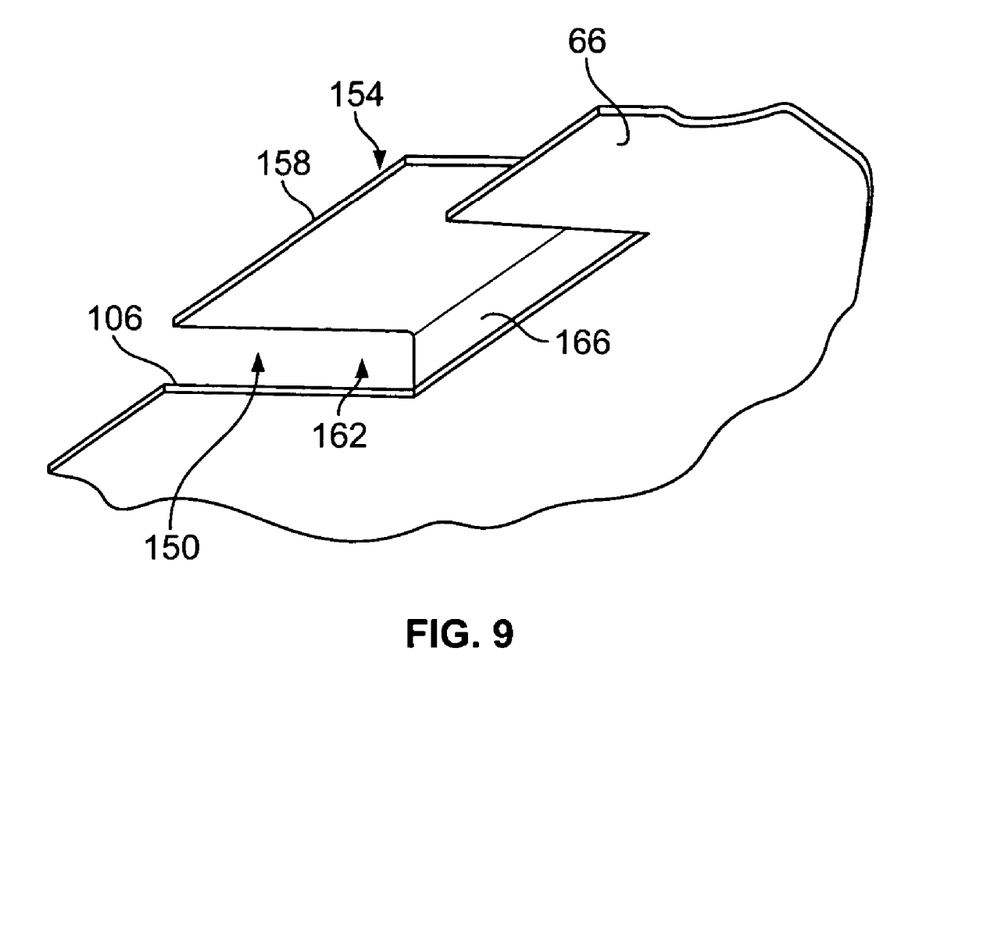
FIG. 9 illustrates a cutaway view of a slot of the bucket shown in FIG. 8.
Figure 10:
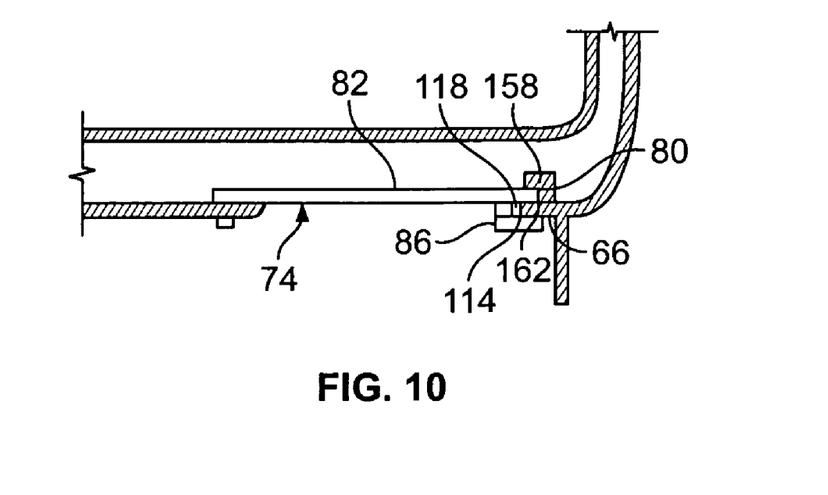
FIG. 10 illustrates a partial cross-sectional side view of the bucket of FIG. 8.

As shown in FIG. 9, each slot 150 includes a flange 154 extending out from the base 66 into the compartment 42 (FIG. 2). The flange 154 includes a side wall 166 extending perpendicularly from the base 66 and a tab 158 that extends parallel to the top surface 106 of the base 66 from the side wall 166. The tab 158 and the top surface 106 of the base 66 define a gap 162 for receiving the rounded section 80 (FIG. 4) of the door 74 as the door 74 rotates along the slot 150. Referring to FIG. 10, as the door 74 rotates along the series of slots 150 (FIG. 8), the rounded edge 114 of the base 66 is received in the gap 118 between the handle 86 and the body 82 of the door 74. Likewise, the rounded section 80 of the door 74 is received in the gap 162 between the tab 158 and the base 66. Thus, the tabs 158 support the door 74 and prevent the door 74 from being pushed or bent into the compartment 42. Also, the side walls 166 (FIG. 9) define a radial path for the rounded section 80 of the door 74 and thus guide and restrain the movement of the door 74 as it is rotated between the open and closed positions.

Returning to FIG. 8, without the tab 90 of the embodiment of FIG. 3, the door 74 reaches the open position when the handle 86 engages the second end 126 of the rounded edge 114 of the aperture 110 and reaches the closed position when the handle 86 engages the first end 124 of the rounded edge 114 of the aperture 110. Additionally, the flanges 154 (FIG. 9) may be positioned at intervals around the rounded edge 114 of the aperture 110 to engage and retain the door 74 when the door 74 is in the closed position. Alternatively, instead of a series of slots 150, the base 66 may have one large curved slot with flanges 154. Alternatively, instead of a series of flanges 154, the base 66 may have one large flange 154 that extends around the slots 150.

Alternatively, other arrangements may be used to guide and control the rotation of the door 74 along the base 66. For example, the door 74 may be located along the bottom surface 122 of the base 66, not along the top surface 106 in the compartment 42. The door 74 may move within the gaps of flanges extending out from the bottom surface 122 of the base 60 instead of the top surface 106. Alternatively, the door 74 may have a tab that extends through a long curved slot into the compartment 42 along the top surface 106 of the base 66. Alternatively, any combination of the above may be used to rotate the door 74.

Figure 11:
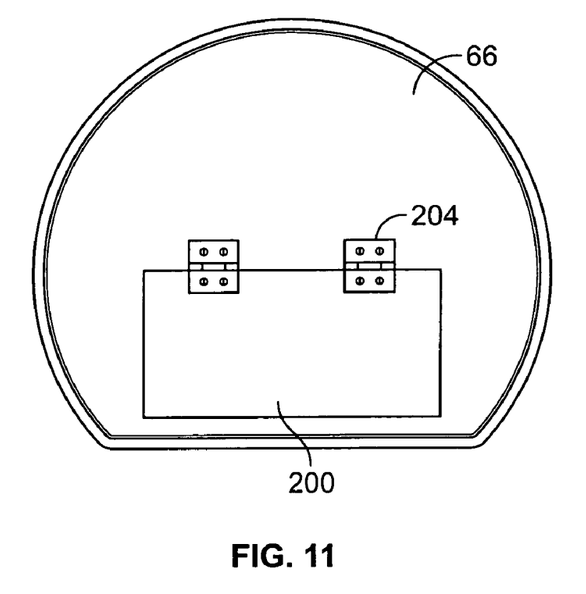
FIG. 11 illustrates a bottom view of a bucket formed according to an embodiment of the present invention.
Figure 12:
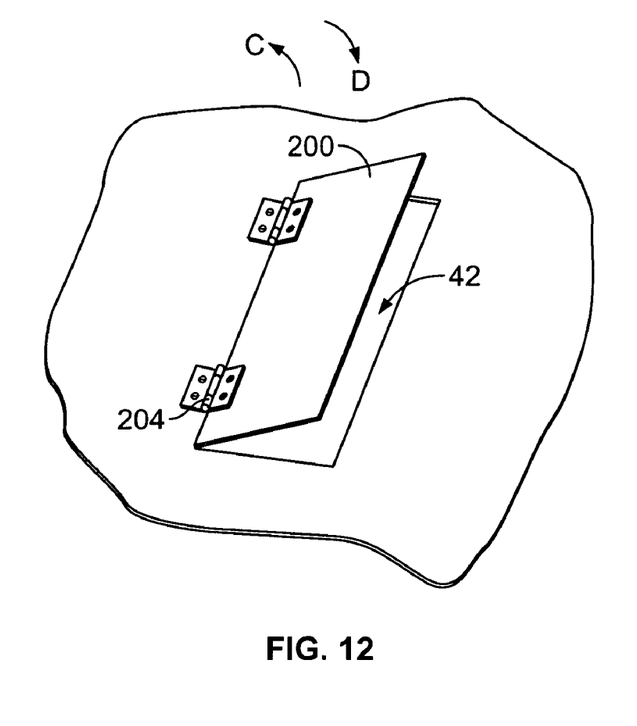
FIG. 12 illustrates a partial view of a bucket door formed according to an embodiment of the present invention.

Alternatively, different kinds of doors may be used to provide access to the compartment 42. For example, as shown in FIG. 11, at least one door 200 may be mounted to the base 66 by at least one hinge 204. The door 200 is shown in the closed position covering the aperture 110 (FIG. 5) and compartment 42 (FIG. 2). Referring to FIG. 12, the door 200 may be moved in the direction of arrow C to rotate about the hinge 204 to an open position and expose the compartment 42. The door 200 may be rotated in the direction of arrow D back to the closed position. The door 200 may further include a handle for gripping and a gap through which the power cord extends.

Figure 13:
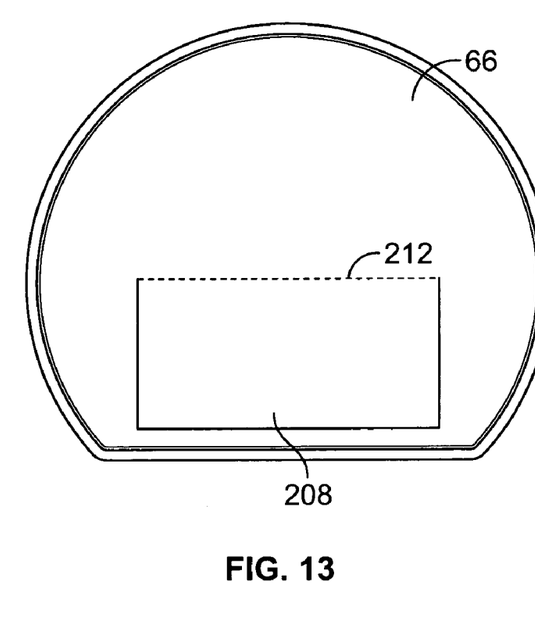
FIG. 13 illustrates a bottom view of a bucket formed according to an embodiment of the present invention.
Figure 14:
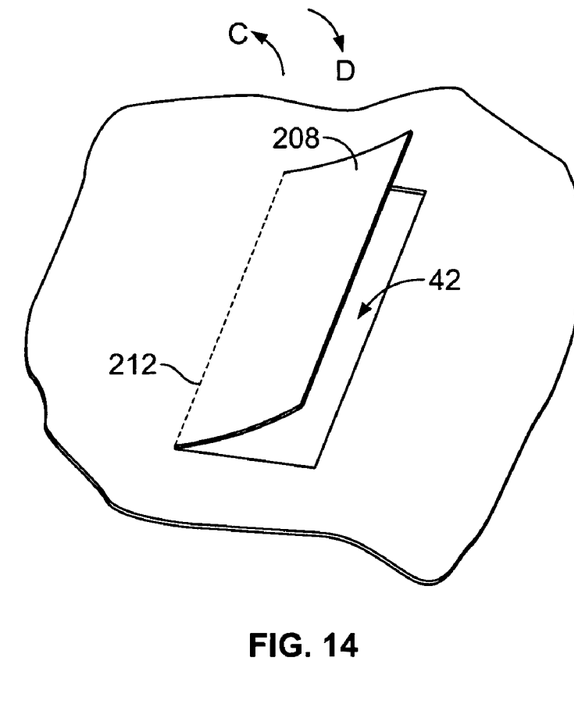
FIG. 14 illustrates a partial view of a bucket door formed according to an embodiment of the present invention.

As shown in FIG. 13, at least one door or flap 208 may be mounted to the base 66 by a living hinge 212. The living hinge 212 is a thin plastic section, or sections, that flexes to allow the door 208 to be rotated thereabout. The door 208 is shown in the closed position covering the aperture 110 (FIG. 5) and compartment 42 (FIG. 2). Referring to FIG. 14, the door 208 may be moved in the direction of arrow C to rotate about the living hinge 212 to an open position and expose the compartment 42. The door 208 may be rotated in the direction of arrow D back to the closed position. The door 208 may further include a handle for gripping and a gap through which the power cord extends.

Alternatively, the door may be a thin square or rectangular sheet that slides along parallel grooves or slots laterally (as opposed to radially) along the base 66 to expose and cover the aperture 110. Alternatively, the door may be snapped onto the base 66 over the aperture 110, or off of the base 66, by use of a system of corresponding plastic tongues and grooves. Alternatively, the door may be a door cover that is attachable and detachable from the base 66 by Velcro or other fasteners.

Alternatively, the bucket 10 having a compartment 42 with an access door 74 may be used for other applications than carrying a heater and power cord. The door can be used to access any number of different items stored in the compartment. Also, the compartment and access door are not limited to use with a bucket, but may be used with larger container such as a tank.

The bucket of the different embodiments provides several advantages over conventional buckets with compartments. The user simply opens the door on the bottom of the bucket to gain access to the compartment. The compartment can be used to store a heater and power cord, and the door can be closed. around the cord when the cord is plugged into an outlet to activate the heater. When the user no longer needs to use the heater, the user simply opens the door again and replaces the cord within the compartment and then closes the door about the cord. The operator does not have to detach and re-attach the entire bottom of the bucket every time the user wishes to open the compartment. Furthermore, the operator does not need to struggle with aligning connection parts of the bottom section of the bucket with connection parts of the top section of the bucket to cover the compartment. Nor does the user have to snapably connect and disconnect corresponding connection parts of the top and bottom sections of the bucket.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A bucket, comprising:
a bottom section and a side wall extending upwardly therefrom to define an interior region, said bottom section having a compartment located therein, said bottom section further including a door that may be moved between a first position that allows access to said compartment and a second position that closes said compartment wherein said door is disposed along a plane and said door rotates about an axis that is generally perpendicular to the plane of said door from said first position to said second position.

2. The bucket of claim 1, further including a heater disposed along said side wall, said heater having a power cord connected thereto.

3. The bucket of claim 1, wherein said bottom section includes a base, said base having an aperture that opens to said compartment, said door being mounted to said base to move between said first position exposing said aperture and said closed position covering said aperture.

4. The bucket of claim 1, wherein said bucket includes an inner section disposed within an outer section to define said compartment therebetween.

5. The heated bucket system of claim 1, wherein said bottom section includes a base, said door being rotatably connected to said base such that said door is rotatable with respect to said base between said first position and said second position.

6. The heated bucket system of claim 1, wherein said door includes a handle for moving said door.

7. A heated bucket system, comprising:
a bucket having a bottom section and a side wall extending upwardly from said bottom section, said bottom section including a compartment disposed therein and a door disposed proximate said compartment, wherein said door is disposed along a plane and said door rotates about an axis that is generally perpendicular to said plane of said door;
a heater disposed to heat said bucket; and
a power cord disposed within said compartment and being connected to said heater for delivering power thereto, said door being movable to open a portion of said compartment such that said power cord can be extended out of said compartment.

8. The heated bucket system of claim 7, wherein said door is movable to close said compartment.

9. The heated bucket system of claim 7, wherein said bottom section includes a base, said base having an aperture that opens to said compartment, said door mounted to said base to move between a closed position covering said aperture and an open position exposing said aperture.

10. The heated bucket system of claim 7, wherein said bucket includes an inner section disposed within an outer section to define said compartment therebetween.

11. The heated bucket system of claim 7, wherein said bottom section includes a base, said door being connected to said base by a pin, said door being rotatable about said pin between a closed position covering said compartment and an open position exposing said compartment.

12. The heated bucket system of claim 7, wherein said bottom section includes a base, said door being connected to said base by a hinge, said door being rotatable about said hinge between a closed position covering said compartment to and an open position exposing said compartment.

13. The heated bucket system of claim 7, wherein said door is movable to a closed position where said door covers said compartment, said door having a gap such that said power cord extends from said compartment through said gap when said door is in said closed position.

14. The heated bucket system of claim 7, wherein said door is rotatably connected to said bottom section and positioned in said compartment, said door having a handle extending out from said compartment such that said handle is moved to move said door within said compartment between a position closing said compartment and a position opening said compartment.

15. The heated bucket system of claim 7, wherein said power cord is retained within said compartment with said door moved to a position to close said compartment.

16. A heated bucket system, comprising:
an outer bucket section having a first base and a side wall extending upwardly from said first base;
an inner bucket section having a second base and being disposed within said outer bucket section such that said first and second bases define a compartment therebetween, said first base having a door disposed thereon;
a heater disposed to heat said at least one of said inner and outer bucket sections; and
a power cord disposed within said compartment and being connected to said heater for delivering power thereto, said door being movable to open a portion of said compartment such that said power cord can be extended out of said compartment, wherein said door is disposed along a plane and said door rotates about an axis that is generally perpendicular to said plane of said door.

17. The heated bucket system of claim 16, wherein said door is movable to close said compartment.

18. The heated bucket system of claim 16, wherein said first base includes an aperture that opens to said compartment, said door rotatable about said base between a closed position covering said aperture and an open position exposing said aperture.

19. The heated bucket system of claim 16, wherein said door is movable to a closed position where said door covers said compartment, said door having a gap such that said power cord extends from said compartment through said gap when said door is in said closed position.

20. The heated bucket system of claim 16, wherein said door being connected to said first base by a pin, said door being rotatable about said pin between a closed position covering said compartment and an open position exposing said compartment.

21. The heated bucket system of claim 16, wherein said door being connected to said first base by a hinge, said door being rotatable about said hinge between a closed position covering said compartment to and an open position exposing said compartment.

22. A heated bucket system, comprising:
an outer bucket section having a first base and a side wall extending upwardly from said first base;
an inner bucket section having a second base and being disposed within said outer bucket section such that said first and second bases define a compartment therebetween, said first base having an aperture that opens to said compartment and a door mounted to said first base such that said door is rotatable between a first position and a second position about said aperture, wherein said door is disposed along a plane and said door rotates about an axis that is generally perpendicular to the plane of said door from said first position to said second position;
a heater disposed to heat said at least one of said inner and outer bucket sections; and
a power cord disposed within said compartment and being connected to said heater for delivering power thereto, wherein when said door is in said first position, said aperture is at least partially open to provide access to said power cord in said compartment and when said door is in said second position, said aperture is mostly covered to close said compartment.

23. The heated bucket system of claim 22, wherein said door is connected to said first base by a pin such that said door may rotate about said pin between said first and second positions.

24. The heated bucket system of claim 22, wherein said first base includes at least one slot proximate said aperture and an edge along said aperture, said door including a tab received in said slot, said tab defining a gap for receiving said edge of said first base, said tab moving within said slot and said edge within said gap as said door is rotated between said first and second positions.

25. The heated bucket system of claim 22, wherein said door includes a handle along the periphery thereof and said first base includes an edge along said aperture, said handle defining a gap for receiving said edge as said door is rotated between said first and second positions.

26. The heated bucket system of claim 22, wherein said first base includes at least one slot proximate said aperture, said at least one slot having a flange extending therefrom into said compartment to define a gap between said flange and said first base, said door passing through said gap as said door is rotated between said first and second positions.

27. A heated bucket system, comprising:
a bucket having a bottom section and a side wall extending upwardly from said bottom section, said bottom section including a compartment disposed therein and a door disposed proximate said compartment, wherein said door is rotatably connected to said bottom section and positioned in said compartment, wherein said door having a handle extending out from said compartment such that said handle is moved to move said door within said compartment between a position closing said compartment and a position opening said compartment;
a heater disposed to heat said bucket; and
a power cord disposed within said compartment and being connected to said heater for delivering power thereto, said door being movable to open a portion of said compartment such that said power cord can be extended out of said compartment.

28. A heated bucket system, comprising:
an outer bucket section having a first base and a side wall extending upwardly from said first base;
an inner bucket section having a second base and being disposed within said outer bucket section such that said first and second bases define a compartment therebetween, said first base having an aperture that opens to said compartment and a door mounted to said first base such that said door is rotatable between a first position and a second position about said aperture, wherein said first base includes at least one slot proximate said aperture and an edge along said aperture, said door including a tab received in said slot, said tab defining a gap for receiving said edge of said first base, said tab moving within said slot and said edge within said gap as said door is rotated between said first and second positions;
a heater disposed to heat said at least one of said inner and outer bucket sections; and
a power cord disposed within said compartment and being connected to said heater for delivering power thereto, wherein when said door is in said first position, said aperture is at least partially open to provide access to said power cord in said compartment and when said door is in said second position, said aperture is mostly covered to close said compartment.

29. A heated bucket system, comprising:

an outer bucket section having a first base and a side wall extending upwardly from said first base;

an inner bucket section having a second base and being disposed within said outer bucket section such that said first and second bases define a compartment therebetween, said first base having an aperture that opens to said compartment and a door mounted to said first base such that said door is rotatable between a first position and a second position about said aperture, wherein said door includes a handle along the periphery thereof and said first base includes an edge along said aperture, said handle defining a gap for receiving said edge as said door is rotated between said first and second positions;

a heater disposed to heat said at least one of said inner and outer bucket sections; and a power cord disposed within said compartment and being connected to said heater for delivering power thereto, wherein when said door is in said first position, said aperture is at least partially open to provide access to said power cord in said compartment and when said door is in said second position, said aperture is mostly covered to close said compartment.

30. A heated bucket system, comprising:

an outer bucket section having a first base and a side wall extending upwardly from said first base;

an inner bucket section having a second base and being disposed within said outer bucket section such that said first and second bases define a compartment therebetween, said first base having an aperture that opens to said compartment and a door mounted to said first base such that said door is rotatable between a first position and a second position about said aperture, wherein said first base includes at least one slot proximate said aperture, said at least one slot having a flange extending therefrom into said compartment to define a gap between said flange and said first base, said door passing through said gap as said door is rotated between said first and second positions;

a heater disposed to heat said at least one of said inner and outer bucket sections; and a power cord disposed within said compartment and being connected to said heater for delivering power thereto, wherein when said door is in said first position, said aperture is at least partially open to provide access to said power cord in said compartment and when said door is in said second position, said aperture is mostly covered to close said compartment.

* * * * *